No. 863,306. PATENTED AUG. 13, 1907.
F. McINTYRE.
RUBBER TIP FOR LEAD PENCILS.
APPLICATION FILED JUNE 13, 1907.

Witnesses.
Robert Everitt,
W. Lee Helms.

Inventor:
Frank McIntyre.
By
Atty.

UNITED STATES PATENT OFFICE.

FRANK McINTYRE, OF NEW YORK, N. Y., ASSIGNOR TO EAGLE PENCIL COMPANY, OF NEW YORK, N. Y.

RUBBER TIP FOR LEAD-PENCILS.

No. 863,306.     Specification of Letters Patent.     Patented Aug. 13, 1907.

Application filed June 13, 1907. Serial No. 378,832.

*To all whom it may concern:*

Be it known that I, FRANK McINTYRE, of the city, county, and State of New York, have invented a new and useful Improvement in Rubber Tips for Lead-Pencils, of which the following is a specification.

The characteristic of my improved tip is that the rubber or erasive material is in the shape of a ball, and that this ball is contained in a socket, having slightly more than hemispherical dimensions, and closed upon the ball to such an extent as to prevent the escape of the ball but not to prevent it from turning in its socket, so as to permit it to present new rubbing or erasive surfaces—the wear being in this way distributed over the whole surface of the ball.

Figure 1:
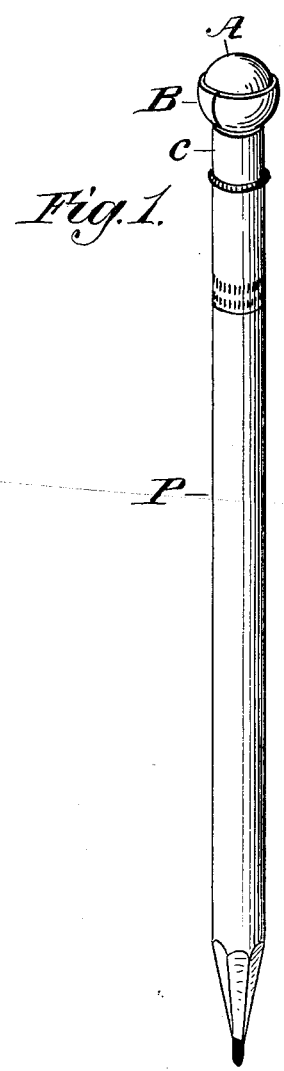
Figure 2:
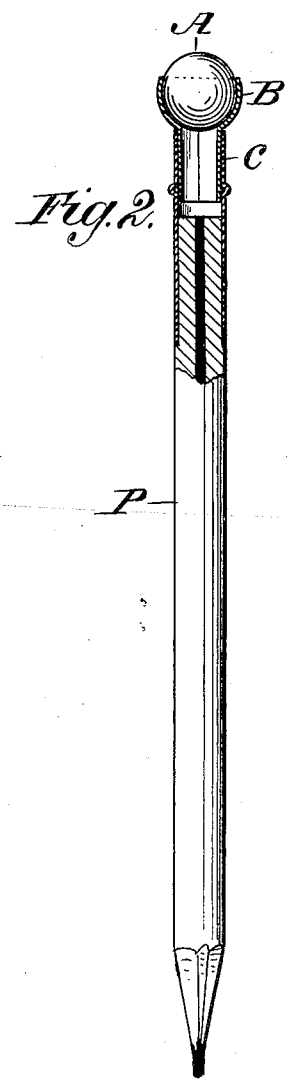
Figure 3:
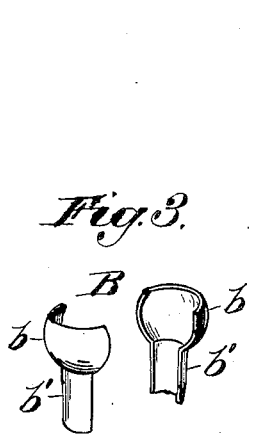
Figure 4:
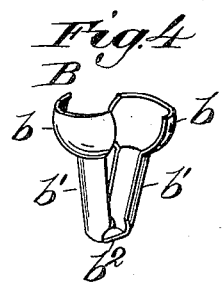

In the accompanying drawing to which I shall now refer for a better understanding of my invention—Figure 1 is a perspective view of a lead pencil provided with a tip embodying my invention. Fig. 2 is an axial section of the same. Fig. 3 is a view of the two sheet-metal halves of the socket between which the ball of erasive material is held. Fig. 4 is a modified form of socket in which the two halves thereof are made in a single piece from sheet metal—the junction of the two halves being at the shank end of the socket.

In the drawing A is the ball of rubber or erasive material; and B is the socket proper. This socket is of a corresponding shape to the ball, and in dimensions is slightly more than a hemisphere, so that it will close on the ball far enough above the center line to prevent the escape of the latter. The ball thus is held in the socket, while at the same time it may revolve in any direction therein. Consequently when the protruding convex portion of the ball is rubbed upon any surface, the ball will turn or move in its socket. This movement should not be too free and unrestricted; and to this end the walls of the socket are closed tightly enough upon the rubber ball to impede more or less, by frictional contact, the rotary movement of the latter, without, however, arresting it entirely. When the rubber is in use, it will naturally be pressed more or less against the walls of the socket, and this will aid in checking too free rotary movement.

I am aware that heretofore it has been proposed to pivot a rubber tip of suitable shape—whether disk or ball—so that it may revolve upon an axis like a wheel. But in such case the revolution is always in one and the same plane, and the wear is upon one portion only of the tip. Whereas in my tip the ball can rotate axially in every direction, and the wear can be distributed over the whole of the surface.

The socket can be made in any suitable way. I prefer to make it of sheet metal in two jaw-like halves $b\ b$, from each half extending a hollow semi-cylindrical extension $b'$, which when fitted together, form a cylindrical stem or shank adapted to be fitted and held in the sheet metal tubular holder $c$ on the end of the pencil P. In Fig. 3 such a socket is shown, made of two separate halves. In Fig. 4 the socket is represented as made and shaped up from a single blank of sheet metal—the two extremities of the semi-cylindrical shank sections $b'\ b'$ being united by a cross strip $b^2$. It is preferred that the divided shank $b'\ b'$ or stem of the socket shall as a whole have a slight taper so that when inserted in the holder $c$ the latter will cause the two parts of the socket to close with the desired firmness or clamping action upon the rubber ball. The socket as a whole may be made removable from the holder $c$, thus permitting the rubber ball to be removed and replaced by a new one whenever desired.

I desire to be understood that my invention is applicable to and includes that style of tip known as a point protector in which the sleeve or holder $c$ is removable from the pencil and can be applied to either end of the same at will.

Having described my improvement and the best way now known to me of carrying the same into practical effect, I state in conclusion that I do not limit myself strictly to the structural details hereinbefore set forth in illustration of my invention, since the same can be varied in a number of particulars without departure from the spirit of the invention; but

What I claim herein as new and desire to secure by Letters Patent is:

In a rubber tip for lead pencils, a ball or sphere of erasive material, and a socket therefor of corresponding shape and size and of slightly more than hemispherical dimensions in which the ball is held capable of rotation, and from which a portion of it protrudes, substantially as and for the purposes hereinbefore set forth.

In testimony whereof I affix my signature in presence of two witnesses.

FRANK McINTYRE.

Witnesses:
   SAMUEL KRAUS,
   OTTO YUGENBEN.